US011962991B2

(12) United States Patent
Stein et al.

(10) Patent No.: US 11,962,991 B2
(45) Date of Patent: Apr. 16, 2024

(54) NON-COINCIDENT AUDIO-VISUAL CAPTURE SYSTEM

(71) Applicant: DTS, Inc., Calabasas, CA (US)

(72) Inventors: Edward Stein, Soquel, CA (US); Martin Walsh, Scotts Valley, CA (US)

(73) Assignee: DTS, Inc., Calabasas, CA (US)

( * ) Notice: Subject to any disclaimer, the term of this patent is extended or adjusted under 35 U.S.C. 154(b) by 278 days.

(21) Appl. No.: 17/625,407

(22) PCT Filed: Jul. 8, 2019

(86) PCT No.: PCT/US2019/040837

§ 371 (c)(1),
(2) Date: Jan. 7, 2022

(87) PCT Pub. No.: WO2021/006871

PCT Pub. Date: Jan. 14, 2021

(65) Prior Publication Data

US 2022/0272477 A1 Aug. 25, 2022

(51) Int. Cl.
*H04S 7/00* (2006.01)
*H04R 3/00* (2006.01)
(Continued)

(52) U.S. Cl.
CPC ............... *H04S 7/30* (2013.01); *H04R 3/005* (2013.01); *H04R 5/027* (2013.01); *H04S 3/008* (2013.01);
(Continued)

(58) Field of Classification Search
CPC ... H04S 7/30; H04S 3/008; H04S 3/02; H04S 2400/01; H04S 2400/11; H04S 2400/15; H04S 2420/11; H04R 3/005; H04R 5/027
See application file for complete search history.

(56) References Cited

U.S. PATENT DOCUMENTS 9,530,421 B2 12/2016 Jot et al.
9,794,721 B2 10/2017 Goodwin et al.
(Continued)

FOREIGN PATENT DOCUMENTS

JP 2010-236944 A 10/2010
JP 2013-514696 A 4/2013
(Continued)

OTHER PUBLICATIONS

"International Application Serial No. PCT/US2019/040837, International Preliminary Report on Patentability dated Sep. 3, 2021", 9 pgs.

(Continued)

*Primary Examiner* — Jason R Kurr
(74) *Attorney, Agent, or Firm* — Lerner David LLP

(57) ABSTRACT

Systems and methods discussed herein can change a frame of reference for a first spatial audio signal. The first spatial audio signal can include signal components representing audio information from different depths or directions relative to an audio capture location associated with an audio capture source device with a first frame of reference relative to an environment Changing the frame of reference can include receiving a component of the first spatial audio signal, receiving information about a second frame of reference relative to the same environment, determining a difference between the first and second frames of reference, and, using the determined difference between the first and second frames of reference, determining a first filter to use to generate at least one component of a second spatial audio signal that is based on the first spatial audio signal and is referenced to the second frame of reference.

19 Claims, 6 Drawing Sheets

(51) Int. Cl.

| | |
|---|---|
| ***H04R 5/027*** | (2006.01) |
| ***H04S 3/00*** | (2006.01) |
| ***H04S 3/02*** | (2006.01) |

(52) U.S. Cl.

CPC ............ *H04S 3/02* (2013.01); *H04S 2400/01* (2013.01); *H04S 2400/11* (2013.01); *H04S 2400/15* (2013.01); *H04S 2420/11* (2013.01)

(56) References Cited

U.S. PATENT DOCUMENTS

| | | | | |
|---|---|---|---|---|
| 9,883,302 | B1 | 1/2018 | Dechellis | |
| 9,973,874 | B2 | 5/2018 | Stein et al. | |
| 2013/0016842 | A1 | 1/2013 | Schultz-Amling et al. | |
| 2014/0350944 | A1 | 11/2014 | Jot et al. | |
| 2016/0227337 | A1 | 8/2016 | Goodwin et al. | |
| 2016/0337778 | A1 | 11/2016 | Jax et al. | |
| 2017/0366912 | A1 | 12/2017 | Stein et al. | |
| 2017/0366913 | A1 | 12/2017 | Stein et al. | |
| 2017/0366914 | A1 | 12/2017 | Stein et al. | |
| 2018/0098174 | A1 | 4/2018 | Goodwin et al. | |
| 2018/0310114 | A1* | 10/2018 | Eronen | H04R 1/406 |
| 2019/0182587 | A1* | 6/2019 | Vilkamo | G10L 25/21 |
| 2019/0246203 | A1* | 8/2019 | Elko | H04R 1/406 |
| 2020/0389722 | A1* | 12/2020 | Zielinski | H04N 7/147 |

FOREIGN PATENT DOCUMENTS

| | | | |
|---|---|---|---|
| JP | 2016-102741 | A | 6/2016 |
| WO | WO-2018100232 | A1 | 6/2018 |
| WO | WO-2019012135 | A1 | 1/2019 |
| WO | WO-2019110913 | A1 | 6/2019 |
| WO | WO-2021006871 | A1 | 1/2021 |

OTHER PUBLICATIONS

"International Application Serial No. PCT/US2019/040837, International Search Report dated Feb. 12, 2020", 5 pgs.

"International Application Serial No. PCT/US2019/040837, Response to Written Opinion filed May 8, 2021 to Written Opinion dated Feb. 12, 2020", 18 pgs.

"International Application Serial No. PCT/US2019/040837, Written Opinion dated Feb. 12, 2020", 11 pgs.

Galdo, Giovanni Del, et al., "Generating Virtual Microphone Signals Using Geometrical Information Gathered By Distributed Arrays", Hands-Free Speech Communication and Microphone Arrays (HSCMA), 2011 Joint Workshop on, IEEE, (May 30, 2011), 185-190.

* cited by examiner

NON-COINCIDENT AUDIO-VISUAL CAPTURE SYSTEM

BACKGROUND

Audio and video capture systems, such as can include or use microphones and cameras, respectively, can be co-located in an environment and configured to capture an audio-visual event such as a musical performance. The captured audio-visual information can be recorded, transmitted, and played back on demand. In an example, the audio-visual information can be captured in an immersive format, such as using a spatial audio format and a multiple-dimension video or image format.

In an example, an audio capture system can include a microphone, a microphone array, or other sensor comprising one or more transducers to receive audio information from the environment. An audio capture system can include or use a spatial audio microphone, such as an ambisonic microphone, configured to capture a three-dimensional or 360-degree soundfield.

In an example, a video capture system can include a single lens camera or a multiple lens camera system. In an example, a video capture system can be configured to receive 360-degree video information, sometimes referred to as immersive video or spherical video. In 360-degree video, image information from multiple directions can be received and recorded concurrently. During playback, a viewer or system can select or control a view direction, or the video information can be presented on a spherical screen or other display system.

Various audio recording formats are available for encoding three-dimensional audio cues in a recording. Three-dimensional audio formats include ambisonics and discrete multi-channel audio formats comprising elevated loudspeaker channels. In an example, a downmix can be included in soundtrack components of multi-channel digital audio signals. The downmix can be backward-compatible, and can be decoded by legacy decoders and reproduced on existing or traditional playback equipment. The downmix can include a data stream extension with one or more audio channels that can be ignored by legacy decoders but can be used by non-legacy decoders. For example, a non-legacy decoder can recover the additional audio channels, subtract their contribution in the backward-compatible downmix, and then render them in a target spatial audio format.

In an example, a target spatial audio format for which a soundtrack is intended can be specified at an encoding or production stage. This approach allows for encoding of a multi-channel audio soundtrack in the form of a data stream compatible with legacy surround sound decoders and one or more alternative target spatial audio formats also selected during an encoding or production stage. These alternative target formats can include formats suitable for the improved reproduction of three-dimensional audio cues. However, one limitation of this scheme is that encoding the same soundtrack for another target spatial audio format can require returning to the production facility to record and encode a new version of the soundtrack that is mixed for the new format.

Object-based audio scene coding offers a general solution for soundtrack encoding independent from a target spatial audio format. An example of an object-based audio scene coding system is the MPEG-4 Advanced Audio Binary Format for Scenes (AABIFS). In this approach, each of the source signals is transmitted individually, along with a render cue data stream. This data stream carries time-varying values of the parameters of a spatial audio scene rendering system. This set of parameters can be provided in the form of a format-independent audio scene description, such that the soundtrack may be rendered in any target spatial audio format by designing the rendering system according to this format. Each source signal, in combination with its associated render cues, can define an "audio object." This approach enables a renderer to implement accurate spatial audio synthesis techniques to render each audio object in any target spatial audio format selected at the reproduction end. Object-based audio scene coding systems also allow for interactive modifications of the rendered audio scene at the decoding stage, including remixing, music re-interpretation (e.g., karaoke), or virtual navigation in the scene (e.g., video gaming).

In an example, a spatially-encoded soundtrack can be produced by two complementary approaches: (a) recording an existing sound scene with a coincident or closely-spaced microphone system, such as can be placed at or near a virtual position of the listener or camera within the scene, or (b) synthesizing a virtual sound scene. The first approach, which uses traditional 3D binaural audio recording, arguably creates as close to a 'you are there' experience as possible through the use of 'dummy head' microphones. In this case, a sound scene is captured live, generally using a mannequin with microphones placed at the ears. Binaural reproduction, where the recorded audio is replayed at the ears over headphones, is then used to recreate the original spatial perception. One of the limitations of traditional dummy head recordings is that they can only capture live events and only from the dummy's perspective and head orientation.

With the second approach, digital signal processing (DSP) techniques can be used to emulate binaural listening by sampling a selection of head related transfer functions (HRTFs) around a dummy head (or a human head with probe microphones inserted into the ear canal) and interpolating those measurements to approximate an HRTF that would have been measured for another location. A common technique is to convert measured ipsilateral and contralateral HRTFs to minimum phase and perform a linear interpolation between them to derive an HRTF pair. The HRTF pair, such as combined with an appropriate interaural time delay (ITD), represents HRTFs for the desired synthetic location. This interpolation is generally performed in the time domain, and can include a linear combination of time-domain filters. The interpolation can include frequency domain analysis (e.g., analysis performed on one or more frequency sub-bands), followed by a linear interpolation between or among frequency domain analysis outputs. Time domain analysis can provide more computationally efficient results, whereas frequency domain analysis can provide more accurate results. In some embodiments, the interpolation can include a combination of time domain analysis and frequency domain analysis, such as time-frequency analysis.

OVERVIEW

The present inventors have recognized that a problem to be solved includes providing an audio and visual capture system with an audio capture element that is coincident or collocated with a video or image capture element. For example, the present inventors have recognized that positioning a microphone such that audio information received from the microphone sounds matched to video that is concurrently received using a camera can interfere with a field of view of the camera. As a result, the microphone is often moved to a non-ideal position relative to the camera.

A solution to the problem can include or use signal processing to correct or reposition received audio information so that it sounds to a listener like the audio information is coincident with, or has substantially the same perspective or frame of reference as, the video information from the camera. In an example, the solution includes translating a spatial audio signal from a first frame of reference to a different second frame of reference, such as within six degrees of freedom or within three-dimensional space. In an example, the solution includes or uses active encoding and decoding. Accordingly, the solution can allow for a later format upgrade, addition of other content or effects, or other additions in correction or reproduction stages. In an example, the solution further includes separating signal components in a decoder stage, such as to further optimize spatial processing and listener experience.

In an example, a system for solving the audio and visual capture system problems discussed herein can include a three-dimensional camera, a 360-degree camera, or other large-field-of-view camera. The system can include an audio capture device or microphone, such as a spatial audio microphone or microphone array. The system can further include a digital signal processor circuit or DSP circuit to receive audio information from the audio capture device, process the audio information, and provide one or more adjusted signals for further processing, such as virtualization, equalization, or other signal shaping.

In an example, the system can receive or determine a location of a microphone and a location of a camera. The locations can include, for example, respective coordinates of the microphone and camera in three-dimensional space. The system can determine a translation between the locations. That is, the system can determine a difference between the coordinates, such as including an absolute distance or a direction. In an example, the system can include or use information about a look direction of one or both of the microphone and camera in determining the translation. The DSP circuit can receive audio information from the microphone, decompose the audio information into respective soundfield components or audio objects using active decoding, rotate or translate the objects according to a determined difference between the coordinates, and then re-encode the objects into a soundfield, object, or other spatial audio format.

This overview is intended to provide a summary of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description that includes examples of systems, methods, apparatuses, and devices for performing spatial audio signal processing, such as for coordinating audio-visual program information, reference is made to the accompanying drawings, which form a part of the detailed description. The drawings show, by way of illustration, specific embodiments in which the inventions disclosed herein can be practiced. These embodiments are generally referred to herein as "examples." Such examples can include elements in addition to those shown or described. However, the present inventors also contemplate examples in which only those elements shown or described are provided. The present inventors contemplate examples using any combination or per mutation of those elements shown or described (or one or more aspects thereof), either with respect to a particular example (or one or more aspects thereof), or with respect to other examples (or one or more aspects thereof) shown or described herein.

As used herein, the phrase "audio signal" is a signal that is representative of a physical sound. Audio processing systems and methods described herein can include hardware circuitry and/or software configured to use or process audio signals using various filters. In some examples, the systems and methods can use signals from, or signals corresponding to, multiple audio channels. In an example, an audio signal can include a digital signal that includes information corresponding to multiple audio channels. Some example of the present subject matter can operate in the context of a time series of digital bytes or words, where these bytes or words form a discrete approximation of an analog signal or ultimately a physical sound. The discrete, digital signal corresponds to a digital representation of a periodically sampled audio waveform.

Figure 1:
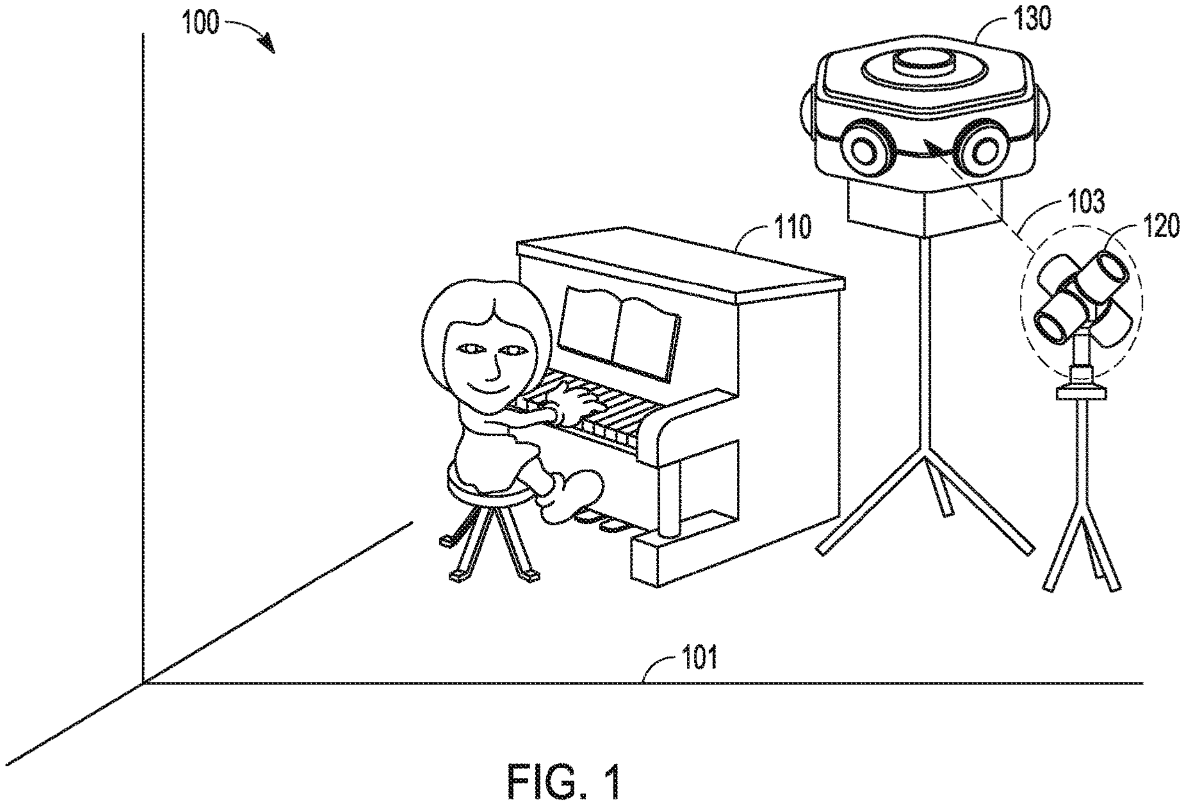
FIG. 1 illustrates generally an example of a first environment that can include an audio-visual source, an audio capture device, and a video capture device.

FIG. 1 illustrates generally an example of a first environment 100 that can include an audio-visual source 110, an audio capture device 120, and a video capture device 130. The first environment 100 can be a three-dimensional space as indicated by the axes 101, such as having a width, depth, and height. Each of the elements in the first environment 100 can be provided in a different location as indicated. That is, the different physical elements can occupy different portions of the first environment 100. Information from the audio capture device 120 and/or the video capture device 130 can be concurrently received and recorded as an audio-visual program using recording hardware and software.

In the example of FIG. 1, the audio-visual source 110 includes a piano and a piano player, and the piano player can be a vocalist. Music, vibrations, and other audible information can emanate away from the piano in substantially all directions into the first environment 100. Similarly, vocalizations or other noises can be produced by the vocalist and can emanate into the first environment 100. Since the vocalist and the piano do not occupy exactly the same portion of the first environment 100, audio originating from or produced by these respective sources can have different effective origins, as further explained below.

The audio capture device 120 can include a microphone, or microphone array, that is configured to receive audio information produced by the audio-visual source 110, such as the piano or the vocalist. In an example, the audio capture device 120 includes a soundfield microphone or ambisonic microphone and is configured to capture audio information in a three-dimensional audio signal format.

The video capture device 130 can include a camera, such as can have one or multiple lenses or image receivers. In an example, the video capture device 130 includes a large-field-of-view camera, such as a 360-degree camera. Information received or recorded from the video capture device 130 as a portion of an audio-visual program can be used to provide a viewer with an immersive or interactive experience, such as can allow the viewer to "look around" the first environment 100, such as when the viewer uses a head-tracking system or other program navigation tool or device. Audio information, such as can be recorded from the audio capture device 120 concurrently with video information recorded from the video capture device 130, can be provided to the viewer. Audio signal processing techniques can be applied to audio information received from the audio capture device 120 to ensure that the audio information tracks with changes in the viewer's position or look direction as the viewer navigates the program.

In an example, the viewer can experience delocalization or a mismatch between the audio and visual components of an audio-visual program. Such delocalization can be due, at least in part, to the physical difference in location of the audio capture device 120 and the video capture device 130 at the time the audio-visual program is recorded or encoded. In other words, because a transducer of the audio capture device 120 and a lens of the video capture device 130 cannot occupy the same physical point in space, a listener can perceive a mismatch between the recorded audio and visual program information. In some examples, an alignment or default "look" direction of the audio capture device 120 or of the video capture device 130 can be misaligned, further contributing to delocalization issues for a viewer.

The present inventors have recognized that a solution to the delocalization problem can include processing audio information received from the audio capture device 120 to "move" the audio information to be coincident with an origin of the image information from the video capture device 130. In FIG. 1, theoretical movement of the audio capture device 120 is represented by the arrow 103 to indicate a translation of the audio capture device 120 to the location of the video capture device 130. In an example, the solution can include receiving or determining information about a first frame of reference that is associated with the audio capture device 120 and receiving or determining information about a second frame of reference that is associated with the video capture device 130. The solution can include determining a difference between the first and second frames of reference and then applying information about the determined difference to components of an audio signal received by the audio capture device 120. Applying the information about the determined difference can include filtering, virtualization processing, or otherwise shaping one or more audio signals or signal components, such as to move or shift a perceived origin of the audio information to a different location than its origin as recorded. For example, the processing can shift a first frame of reference for the audio information to a different second frame of reference, such as having a different origin or a different orientation.

Figure 2:
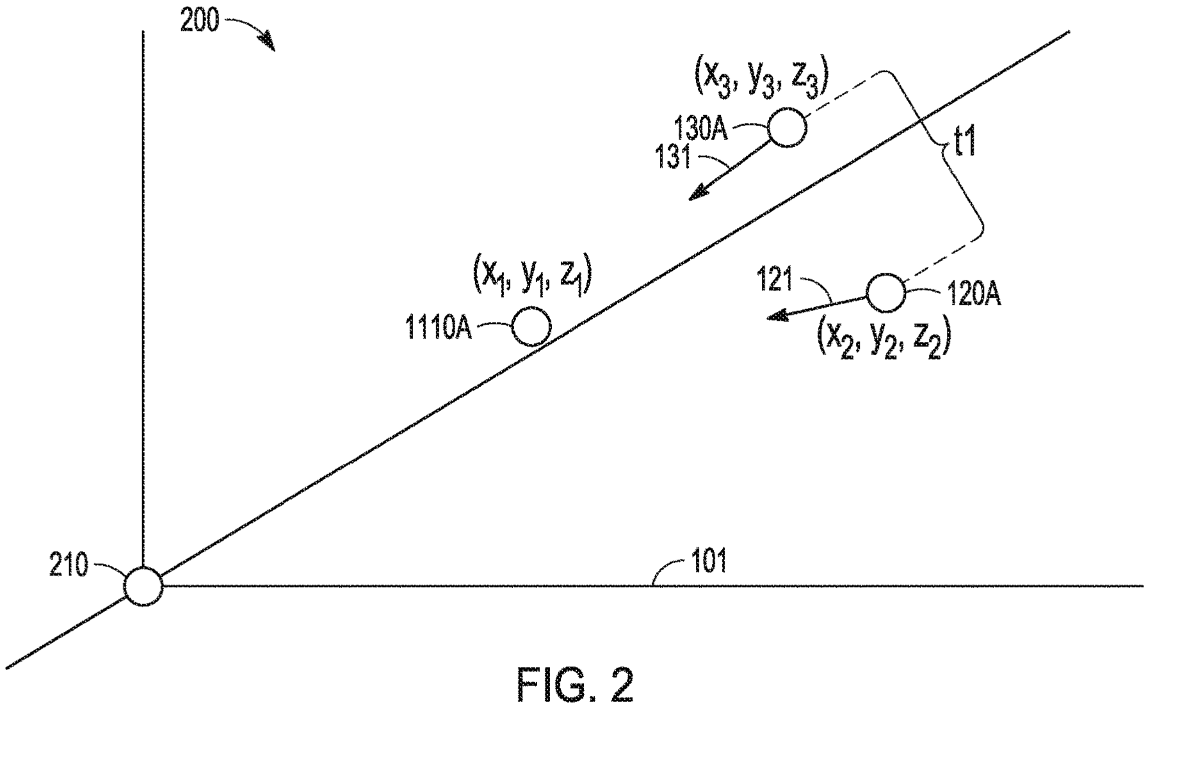
FIG. 2 illustrates generally an example of the first environment from FIG. 1 with the source and capture devices represented by points or positions in space.

FIG. 2 illustrates generally an example 200 of the first environment 100 with the audio-visual source 110, audio capture device 120, and video capture device 130 represented by first, second, and third points 110A, 120A, and 130A, respectively. In the example, each of the points has respective coordinates defining its location in the first environment 100. For example, the audio-visual source 110, such as including a combination of the piano and vocalist, can have an acoustic origin at the first point 110A with a first location $(x_1, y_1, z_1)$. The audio capture device 120 can have an acoustic origin at the second point 120A with a second location $(x_2, y_2, z_2)$. The video capture device 130 can have a visibility origin at the third point 130A with a third location $(x_3, y_3, z_3)$. With the various sources and devices reduced to points, and optionally directions or orientations, in the three-dimensional environment, differences in the locations of the sources can be determined.

In an example, the audio capture source 120, such as represented in FIG. 2 by the second point 120A, can have a first orientation or first reference direction 121. The audio capture source 120 can have a first frame of reference, such as can be defined at least in part by its location (or origin) at the second point 120A or the first reference direction 121. The video capture source 130 can have a second orientation or second reference direction 131. The video capture source 130 can have a second frame of reference, such as can be defined at least in part by its location (or origin) at the third point 130A or the second reference direction 131. The first and second reference directions 121 and 131 need not be aligned; that is, they need not be collinear, parallel, or otherwise related. However, if a reference direction or preferred receiving direction exists, then such information can be considered by downstream processing as further discussed below. In the example of FIG. 2, the first and second reference directions 121 and 131 are not aligned or parallel, although each is generally directed to or pointed toward the first point 110A.

In the example of FIG. 2, the second and third points 120A and 130A are provided a specified first distance apart. A translation between the second and third points 120A and 130A can include information about an absolute distance, such as along a shortest path, between the two points. The translation can include information about a direction by which one is offset from the other or from some reference point in the environment. For example, a translation $t_1$ from the second point 120A to the third point 130A can include information about a distance between the two points, such as can be determined algebraically from the coordinate information, for example, d(120A, 130A)=$\sqrt{[(x_3-x_2)^2+(y_3-y_2)^2+(z_3-z_2)^2]}$). The translation $t_1$ can optionally include a direction component, such as can be provided in degrees, for example, d(120A, 130A)=45 degrees. Other coordinate or measurement systems can similarly be used.

In an example, the first environment 100 can include a source tracker 210. The source tracker 210 can include a device that is configured to receive or sense information about a position of one or more objects in the first environment 100. For example, the source tracker 210 can include a 3D vision or depth sensor configured to monitor a location or position of the audio capture device 120 or the video capture device 130. In an example, the source tracker 210 can provide calibration or location information to a processor circuit (see, e.g., the processor circuit 410 in the example of FIG. 4) for use in determining a frame of reference or a difference between frames of reference. In an example, the source tracker 210 can provide an interrupt or re-calibration signal to the processor circuit and, in response, the processor circuit can recalibrate one or more frames of reference or determine a new difference between multiple different frames of reference. The source tracker 210 is illustrated in FIG. 2 as being positioned at the origin of the axes 101 in the first environment 100, however, the source tracker 210 can be located elsewhere in the first environment 100. In an example, the source tracker 210 comprises a portion of the audio capture source 120 or video capture source 130 or other device.

In an example, one or more of the audio capture source 120 and video capture source 130 can be configured to self-calibrate or to determine or identify its location in the first environment 100, such as relative to specified reference point. In an example, the source can include, or can be communicatively coupled to, a processor circuit configured to interface with the source tracker 210 or another device, such as a beacon placed in the first environment 100, such that the source can determine or report its location (e.g., in x, y, z coordinates, in radial coordinates, or in some other coordinate system). In an example, one source can determine its location relative to the other without identifying its coordinates or specific location in the first environment. That is, one of the audio capture source 120 and the video capture source 130 can be configured to communicate with the other to identify the magnitude or direction of the translation $t_1$. In an example, each of the sources is configured to communicate with the other and identify and agree on a determined translation $t_1$.

Figure 3:
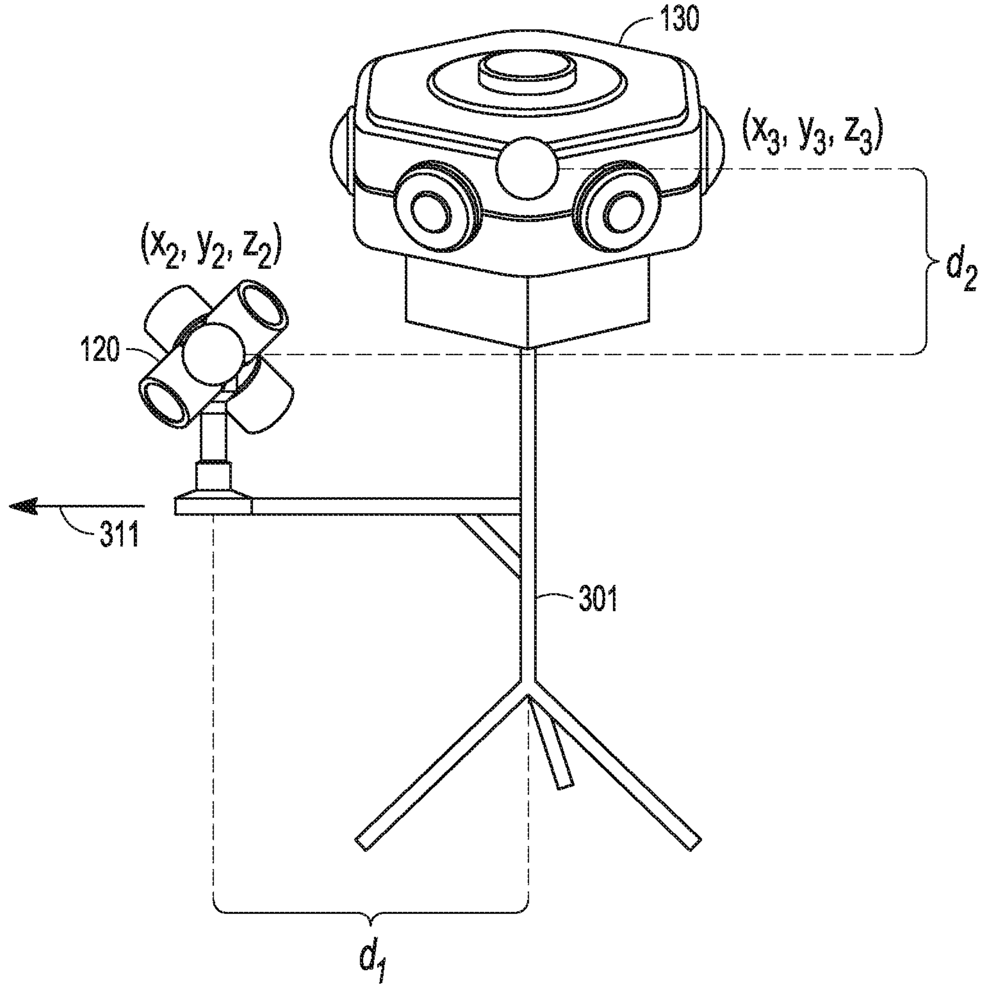
FIG. 3 illustrates generally an example of a rig or fixture that can be configured to hold capture devices in a fixed spatial relationship.

FIG. 3 illustrates generally an example of a rig 301 or fixture that can be configured to hold multiple capture devices in a fixed spatial relationship. In the example of FIG. 3, the rig 301 is configured to hold the audio capture device 120 and the video capture device 130. The rig 301 can be similarly configured to hold multiple audio capture devices, multiple video capture devices, or other combinations of sensors or receivers. Although the rig 301 is illustrated as holding two devices, additional or fewer devices can be held.

The rig 301 can be configured to secure and retain the audio capture device 120 and the video capture device 130 such that a translation between the devices is at least partially fixed, such as in one or more dimensions or directions. In the example of FIG. 3, the rig 301 holds the audio capture device 120 such that an origin of the audio capture device 120 has coordinates $(x_2, y_2, z_2)$. The rig 301 holds the video capture device 130 such that an origin of the video capture device 130 has coordinates $(x_3, y_3, z_3)$. In this example, $x_3=x_2+d_1$, $y_3=y_2\ d_2$, and $z_2=z_3$. Accordingly if location information is known about one device, a location of the other device can be calculated. The rig 301 can be adjustable such that the values of, e.g., $d_1$ or $d_2$, can be selected by a user or technician who arranges the rig 301 in an environment or relative to an audio-visual source to be captured or recorded.

In an example, the rig 301 can have a rig origin or reference, and information about a position of the rig's origin relative to the environment can be provided to a processor circuit for location processing. A relationship between the rig origin and one or more devices held by the rig 301 can be determined. That is, respective locations of the one or more devices held by the rig 301 can be geometrically determined relative to the rig origin.

In an example, the rig 301 can have a rig reference direction 311 or orientation. The rig reference direction 311 can be a look direction or reference direction for the rig 301 or for one or more devices coupled to the rig 301. A device coupled to the rig 301 can be positioned to have the same reference direction as the rig reference direction 311, or an offset can be provided or determined between the rig reference direction 311 and a reference direction or orientation of a device.

In an example, a frame of reference for the audio capture device 120 or the video capture device 130 can be measured manually and provided to a frame of reference processing system by an operator. In an example, the frame of reference processing system can include a user input to receive instructions from a user to change or adjust characteristics or parameters of one or more frames of reference, positions or orientations, such as can be used by the user to achieve a desired coincident audio-visual experience.

Figure 4:
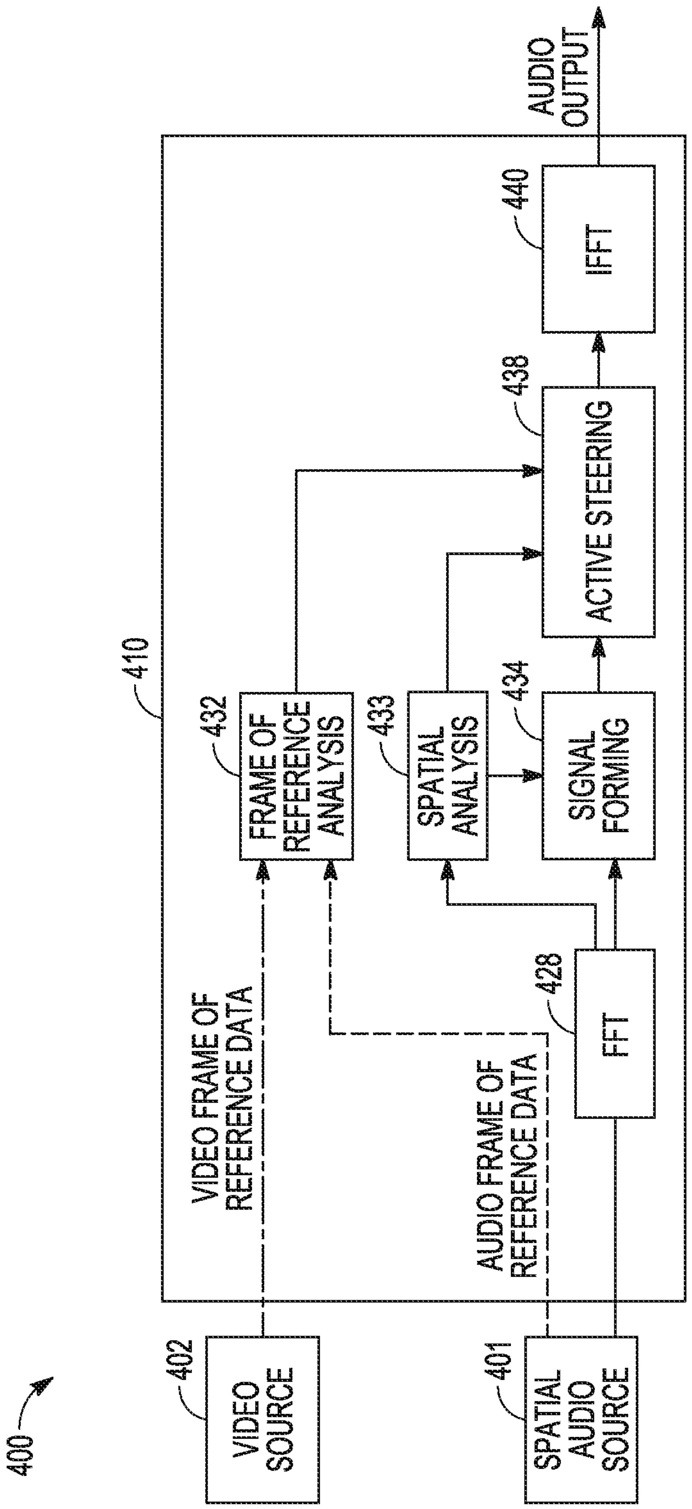
FIG. 4 illustrates generally an example of a block diagram of a system for active steering, spatial analysis, and other signal processing.

FIG. 4 illustrates generally an example of a block diagram 400 of a system for active steering, spatial analysis, and other signal processing. In an example, circuitry configured according to the block diagram 400 can be used to render one or more formed signals in respective directions.

In an example, circuitry configured according to the block diagram 400 can be used to receive an audio signal having a first frame of reference, such as can be associated with the audio capture device 120, and to move or translate the audio signal such that it can be reproduced for a listener at a different second frame of reference. The received audio signal can include a soundfield or 3D audio signal including one or more components or audio objects. The second frame of reference can be a frame of reference associated with or corresponding to one or more images received using the video capture device 130. The first and second frames of reference can be fixed or can be dynamic. The movement or translation of the audio signal can be based on information determined (e.g., continuously or intermittently updated) about a relationship between the first and second frames of reference.

In an example, the audio signal translation to a second frame of reference can include using a processor circuit 410, such as comprising one or more processing modules, to receive a first soundfield audio signal and determine positions and directions for components of the audio signal. Reference frame coordinates for the audio signal components can be received, measured, or otherwise determined. In an example, the information can include information about multiple different reference frames or about a translation from the first to the second reference frame. Using the translation information, one or more of the audio objects can be moved or relocated to provide a virtual source corresponding to the second frame of reference. The one or more audio objects, following the translation, can be decoded for reproduction via loudspeakers or headphones, or can be provided to a processor for re-encoding into a new soundfield format.

In an example, the processor circuit 410 can include various modules or circuits or software-implemented processes (such as can be carried out using a general purpose or purpose-built circuit) for performing the audio signal translation between reference frames. In FIG. 4, a spatial audio source 401 provides audio signal information to the processor circuit 410. In an example, the spatial audio source 401 provides audio frame of reference data, corresponding to the audio signal information, to the processor circuit 410. The audio frame of reference data can include information about a fixed or changing origin or reference point for the audio information, such as relative to an environment, or can include orientation or reference direction information for the audio information, among other things. In an example, the spatial audio source 401 can include or comprise the audio capture device 120.

In an example, the processor circuit 410 includes an FFT module 428 configured to receive the audio signal information from the spatial audio source 401 and convert the received signal to the frequency domain. The converted signal can be processed using spatial processing, steering, or panning to change a location or frame of reference for the received audio signal information.

The processor circuit 410 can include a frame of reference analysis module 432. The frame of reference analysis module 432 can be configured to receive audio frame of reference data from the spatial audio source 401 or from another source configured to provide or determine frame of reference information about audio from the spatial audio source 401. The frame of reference analysis module 432 can be configured to receive video or image frame of reference data from a video source 402. In an example, the video source 402 can include the video capture device 130. In an example, the frame of reference analysis module 432 is configured to determine a difference between the audio frame of reference and video frame of reference. Determining the difference can include, among other things, determining a distance or translation between points of reference, or origins, of the respective sources of the audio or visual information from the spatial audio source 401 or the video source 402. In an example, the frame of reference analysis module 432 can be configured to determine locations (e.g., coordinates) the spatial audio source 401 and/or the video source 402 in an environment and then determine a difference or relationship between their respective frames of reference. In an example, the frame of reference analysis module 432 can be configured to determine a source location or coordinates using information about a rig used to hold or position a source in an environment, using information from a position or depth sensor configured to monitor the source or device locations, or using other means.

In an example, the processor circuit 410 includes a spatial analysis module 433 that is configured to receive the frequency domain audio signals from the FFT module 428 and, optionally, receive at least a portion of the audio frame of reference data or other metadata associated with the audio signals. The spatial analysis module 433 can be configured to use a frequency domain signal to determine a relative location of one or more signals or signal components thereof. For example, the spatial analysis module 433 can be configured to determine that a first sound source is or should be positioned in front (e.g., 0° azimuth) of a listener or a reference video location and a second sound source is or should be positioned to the right (e.g., 90° azimuth) of the listener or reference video location. In an example, the spatial analysis module 433 can be configured to process the received signals and generate a virtual source that is positioned or intended to be rendered at a specified location relative to the reference video location, including when the virtual source is based on information from one or more spatial audio signals and each of the spatial audio signals corresponds to a respective different reference location, such as relative to a reference position. In an example, the spatial analysis module 433 is configured to determine source locations or depths, and use frame of reference-based analysis to transform the sources to a new location, such as corresponding to a frame of reference for the video source. Spatial analysis and processing of soundfield signals, including ambisonic signals, is discussed at length in U.S. patent application Ser. No. 16/212,387, titled "Ambisonic Depth Extraction", and in U.S. Pat. No. 9,973,874, titled "Audio rendering using 6-DOF tracking", each of which is incorporated herein by reference in its entirety.

In an example, the audio signal information from the spatial audio source 401 includes a spatial audio signal and comprises a portion of a submix. A signal forming module 434 can be configured to use a received frequency domain signal to generate one or more virtual sources that can be output as sound objects with associated metadata. In an example, the signal forming module 434 can use information from the spatial analysis module 433 to identify or place the various sound objects in a designated location or depth in a soundfield.

In an example, signals from the signal forming module 434 can be provided to an active steering module 438, such as can include or use virtualization processing, filtering, or other signal processing to shape or modify audio signals or signal components. The steering module 438 can receive data and/or audio signal inputs from one or more modules, such as the frame of reference analysis module 432, the spatial analysis module 432, or the signal forming module 434. The steering module 438 can use signal processing to rotate or pan the received audio signals. In an example, the active steering module 438 can receive first source outputs from the signal forming module 434 and pan the first source based on the outputs of the spatial analysis module 432 or on the outputs of the frame of reference analysis module 432.

In an example, the steering module 438 can receive a rotational or translational input instruction from the frame of reference analysis module 432. In an such an example, the frame of reference analysis module 432 can provide data or instructions for the active steering module 438 to apply a known or fixed frame of reference adjustment (e.g., between received audio and visual information).

Following any rotational or translational changes, the active steering module 438 can provide signals to an inverse FFT module 440. The inverse FFT module 440 can generate one or more output audio signal channels with or without additional metadata. In an example, the audio output from the inverse FFT module 440 can be used as an input for a sound reproduction system or other audio processing system. In an example, an output of the active steering module 438 or the inverse FFT module 440 can include a depth-extended ambisonic signal, such as can be decoded by the systems or methods discussed in U.S. Pat. No. 10,231,073, "Ambisonic Audio Rendering with Depth Decoding", which is incorporated herein by reference. In an example, it can be desirable to remain output format agnostic and support decoding to various layout or rendering methods, for example, including mono stems with position information, base/bedmixes, or other soundfield representations such as including ambisonic formats.

Figure 5:
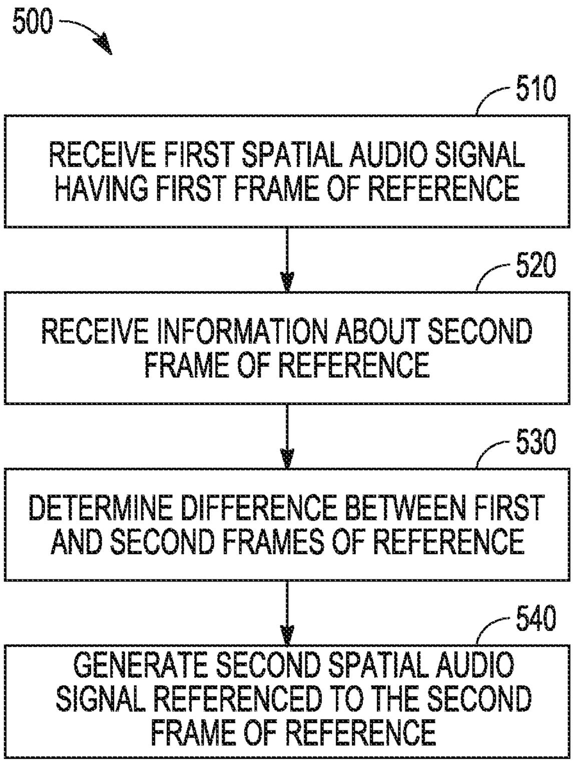
FIG. 5 illustrates generally an example of a method that can include changing a frame of reference for a spatial audio signal.

FIG. 5 illustrates generally an example of a first method 500 that can include changing a frame of reference for a spatial audio signal, such as using the processor circuit 410. At step 510, the first method 500 can include receiving a first spatial audio signal having a first frame of reference. In an example, receiving the first spatial audio signal can include using the audio capture device 120 and the first spatial audio signal can include, e.g., an ambisonic signal, such as comprising depth or weight information for one or more different signal components. In an example, receiving the first spatial audio signal can include receiving metadata or some other data signal or indication of a first frame of reference that is associated with the first spatial audio signal. In an example, information about the first frame of reference can include a location or coordinates of the audio capture device 120, an orientation or look direction (or other reference direction) of the audio capture device 120, or a relationship between a location of the audio capture device 120 and a reference position or origin in an environment.

At step 520, the first method 500 can include receiving information about a second frame of reference, such as a target frame of reference. In an example, the second frame of reference can have, or can be associated with, a different location than the audio capture device 120, but can be generally in the same environment or vicinity as the audio capture device 120. In an example, the second frame of reference corresponds to a location of the video capture device 130, such as can be provided in substantially the same environment as the audio capture device 120. In an example, the second frame of reference can include an orientation or look direction (or other reference direction) that can be the same as, or different than, that of the first frame of reference and the audio capture device 120. In an example, receiving information about the first and second frames of reference, such as at the steps 510 and 520, can use the frame of reference analysis module 432 from the example of FIG. 4.

At step 530, the first method 500 can include determining a difference between the first and second frames of reference. In an example, the frame of reference analysis module 432 from FIG. 4 can determine a translation, such as including a geometric distance and an angle or other offset or difference in position, between the first and second frames of reference. In an example, step 530 includes using respective point or location-based representations of the first and second frames of reference and determining a difference between locations of, or a distance between, the points, such as described above in the discussion of FIG. 2. In an example, determining the difference at step 530 includes determining a difference at multiple different times, such as intermittently, periodically, or when one or more of the first and second frames of reference changes.

At step 540, the first method 500 can include generating a second spatial audio signal that is referenced to, or has substantially the same perspective as, the second frame of reference. That is, the second spatial audio signal can have the second frame of reference. The second spatial audio signal can be based on one or more components of the first spatial audio signal but with the components processed to reproduce the components as originating from a different location than a location at which the components were originally or previously received or recorded.

In some examples, generating the second spatial audio signal at step 540 can include generating a signal that has a different format than the first spatial audio signal received at step 510, and in some samples, generating the second spatial audio signal includes generating a signal that has the same format as the first spatial audio signal. In an example, the second spatial audio signal includes an ambisonic signal that is a higher-order signal than the first spatial audio signal, or the second spatial audio signal includes a matrix signal, or a multiple-channel signal.

Figure 6:
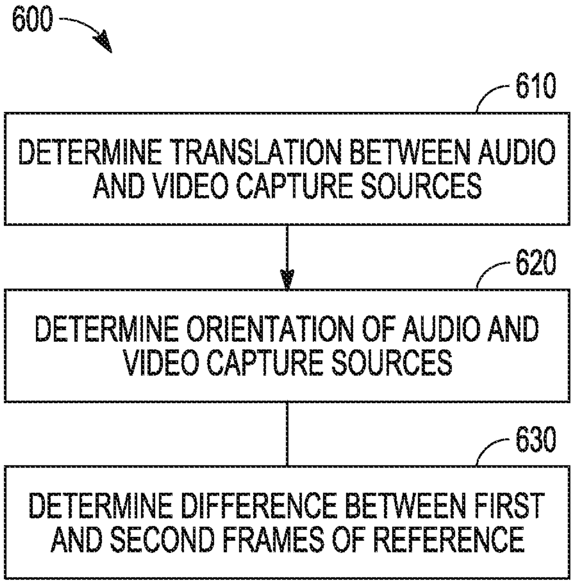
FIG. 6 illustrates generally an example of a method that can include determining a difference between first and second frames of reference.

FIG. 6 illustrates generally an example of a second method 600 that can include determining a difference between first and second frames of reference, such as using the processor circuit 410. In an example, the first and second frames of reference are associated with different capture sources located in an environment, and information about a difference between the frames of reference can be determined using the frame of reference analysis module 432.

At step 610, the second method 600 can include determining a translation between audio and video capture sources. For example, step 610 can include determining an absolute geometric distance or shortest path in free-space between the audio capture source 120 and the video capture source 130 in an environment. In an example, determining the distance can include using cartesian coordinates associated with the capture sources and determining a shortest path between the coordinates. Radial coordinates can similarly be used. In an example, determining the translation at step 610 can include determining a direction from one of the sources to the other.

At step 620, the second method 600 can include determining an orientation of the audio capture source 120 and the video capture source 130. Step 620 can include receiving information about a reference direction or reference orientation or look direction of each of the capture sources. In an example, the orientation information can include information about a direction from each source to an audio-visual target (e.g., from the capture sources to the piano or audio-visual source 110 in the example of FIG. 1). In an example, step 620 can include receiving orientation information about each of the capture sources relative to a specified reference orientation.

At step 630, the second method 600 can include determining a difference between the first and second frames of reference that are associated with different capture sources. For example, step 630 can include using the translation determined at step 610 and using the orientation information determined at step 620. In an example, if the audio and video capture sources have different orientations, as-determined at step 620, then the translation determined at 610 can be adjusted, such as by determining an amount by which to rotate the first frame of reference to coincide with an orientation of the second frame of reference.

Figure 7:
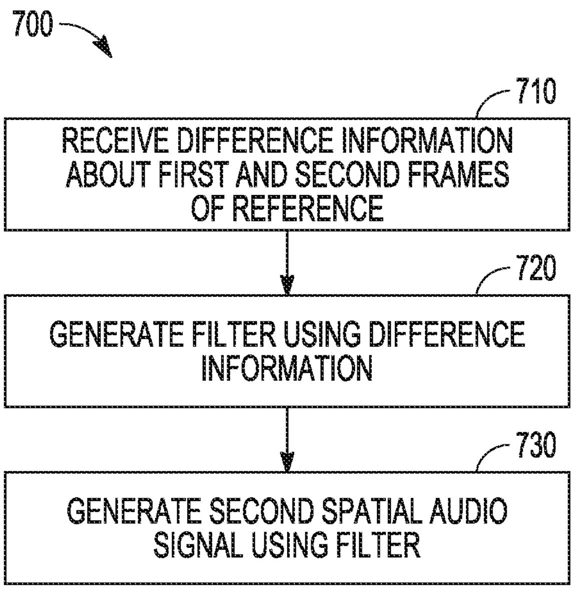
FIG. 7 illustrates generally an example of a method that can include generating a spatial audio signal.

FIG. 7 illustrates generally an example of a third method 700 that can include generating a spatial audio signal. Step 710 can include receiving difference information about first and second frames of reference. In an example, the difference information can be provided by, for example, the frame of reference analysis module 432 from the example of FIG. 4 or from step 630 from the example of FIG. 6.

At step 720, the third method 700 can include generating a filter using the difference information received at step 710. The filter can be configured to support multiple component signal inputs and can have multiple channel or component signal outputs. In an example, step 720 includes providing a multiple-input and multiple-output filter that can be passively applied to received audio signals. Generating the filter can include determining a repanning matrix filter to apply to one or more components of a channel-based audio signal. In the case of ambisonic signals, generating the filter can include determining a filter using an intermediate decoding matrix followed by a repanning matrix and/or an encoding matrix.

Step 720 can include or use the reference frame difference information to select different filters. That is, when the received difference information indicates a translation, such as having a first magnitude, between the first and second reference frames, then step 720 can include generating a first filter based on the first magnitude. When the received difference information indicates a translation having a different second magnitude, then step 720 can include generating a different second filter based on the second magnitude.

At step 730, the third method 700 can include generating a second spatial audio signal using the filter generated at step 720. The second spatial audio signal can be based on a first spatial audio signal but can be updated, such as by a filter generated at step 720, to have the second frame of reference. In an example, generating the second spatial audio signal at step 730 includes using one or more of the signal forming module 434, the active steering module 438, or the inverse FFT module 440 from the example of FIG. 4.

Figure 8:
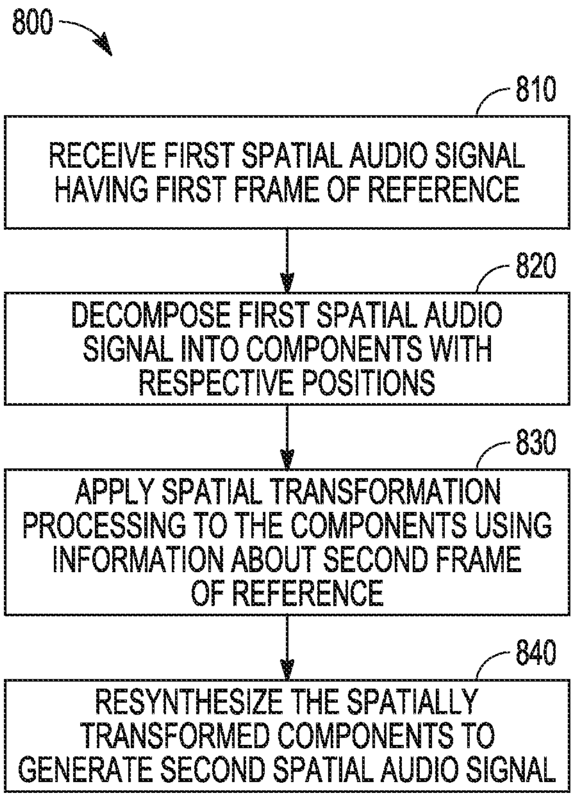
FIG. 8 illustrates generally an example of a method that can include generating a spatial audio signal based on synthesis or resynthesis of different audio signal components.

FIG. 8 illustrates generally an example of a fourth method 800 that can include generating a spatial audio signal based on synthesis, or resynthesis, of different audio signal components, such as using the processor circuit 410. The fourth method 800 can include, at step 810, receiving a first spatial audio signal having a first frame of reference. In an example, receiving the first spatial audio signal can include using the audio capture device 120 and the first spatial audio signal can include, e.g., an ambisonic signal, such as comprising depth, weight, or other information for one or more different signal components. In an example, receiving the first spatial audio signal can include receiving metadata or some other data signal or indication of a first frame of reference that is associated with the first spatial audio signal. In an example, information about the first frame of reference can include a location of the audio capture device 120, an orientation or look direction (or other reference direction) of the audio capture device 120, or a relationship between a location of the audio capture device 120 and a reference position or origin in an environment.

At step 820, the fourth method 800 can include decomposing the first spatial audio signal into respective components, and each of the respective components can have a corresponding position or location. That is, the components of the first spatial audio signal can have a set of respective positions in an environment. In an example, if the first spatial audio signal comprises a first-order B-format signal, then step 820 can include decomposing the signal into a number of audio objects or sub-signals.

At step 830, the fourth method 800 can include applying spatial transformation processing, such as using the processor circuit 410, to one or more of the components of the first spatial audio signal. In an example, applying the spatial transformation processing can be used to change or update a location of the processed components in an audio environment. Parameters of the spatial transformation processing can be selected based on, for example, a target frame of reference for the audio signal components.

Step 830 can include selecting or applying different filters or signal processing to each of multiple different ones of the components of the first spatial audio signal. That is, filters or audio adjustments having different transfer functions can be used to differently process the respective audio signal components such that, when recombined and reproduced for a listener, the audio signal components provide a coherent audio program that has a different frame of reference than the first frame of reference.

At step 840, the fourth method 800 can include resynthesizing the spatially transformed components to generate a second spatial audio signal. The second spatial audio signal can be based on the first spatial audio signal but can have the target frame of reference. Therefore, when reproduced for a listener, the listener can perceive the program information from the first spatial audio signal as having a different location or frame of reference than the first spatial audio signal.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document. Embodiments of the systems and methods for adjusting non-coincident capture sources, such as audio and video capture sources, and other techniques described herein are operational within numerous types of general purpose or special purpose computing system environments or configurations, such as described in the discussion of FIG. 9.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Further, one or any combination of software, programs, or computer program products that embody some or all of the various examples of the virtualization and/or sweet spot adaptation described herein, or portions thereof, may be stored, received, transmitted, or read from any desired combination of computer or machine-readable media or storage devices and communication media in the form of computer executable instructions or other data structures. Although the present subject matter is described in language specific to structural features and methodological acts, it is to be understood that the subject matter defined in the appended claims is not necessarily limited to the specific features or acts described herein. Rather, the specific features and acts described above are disclosed as example forms of implementing the claims.

Various systems and machines can be configured to perform or carry out one or more of the signal processing tasks described herein, including but not limited to audio component positioning or re-positioning, or orientation determination or estimation, such as using HRTFs and/or other audio signal processing for adjusting a frame of reference of an audio signal. Any one or more of the disclosed circuits or processing tasks can be implemented or performed using a general-purpose machine or using a special, purpose-built machine that performs the various processing tasks, such as using instructions retrieved from a tangible, non-transitory, processor-readable medium.

Figure 9:
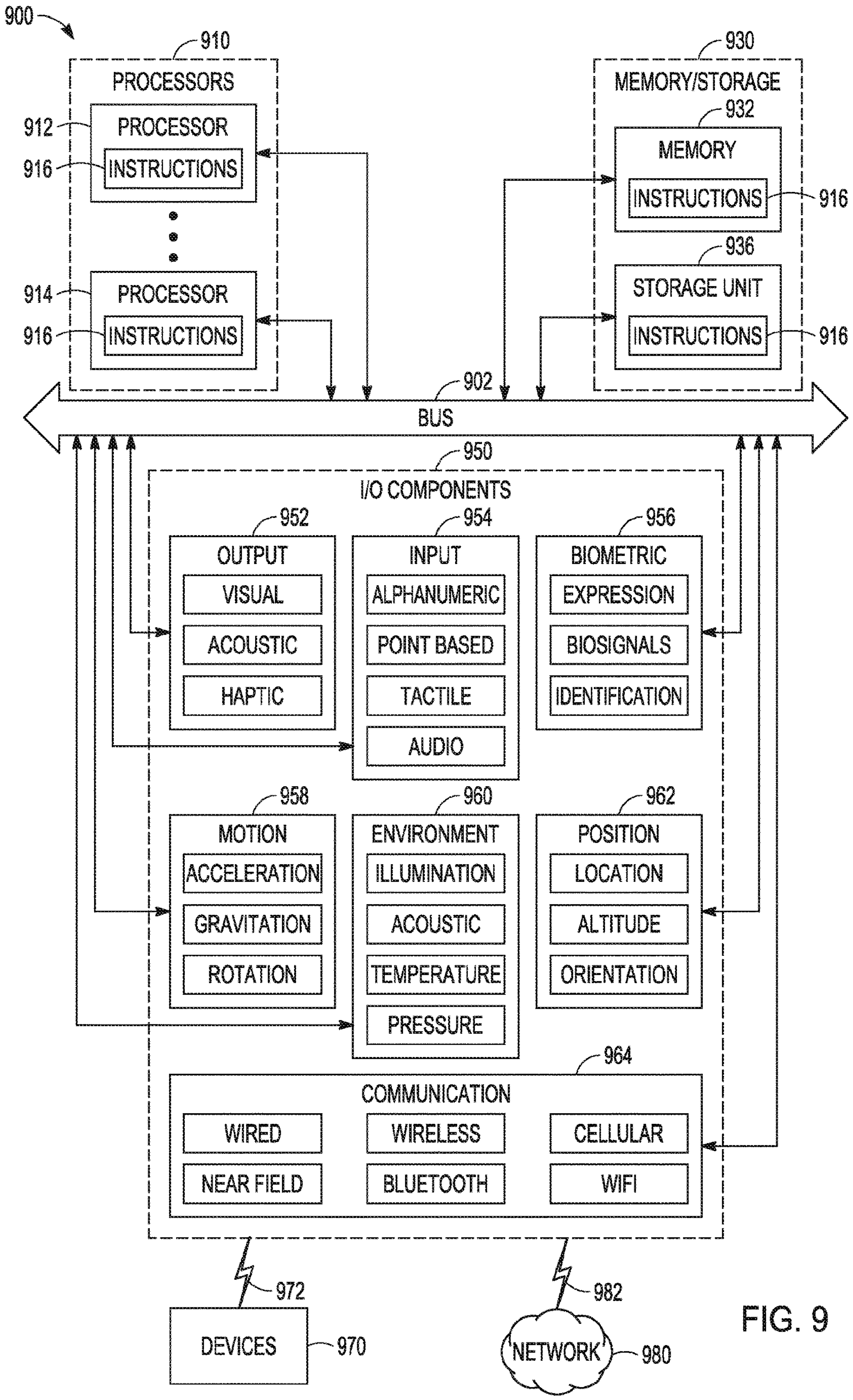
FIG. 9 illustrates generally a block diagram illustrating components of a machine configured to read instructions from a machine-readable medium and perform any one or more of the methods discussed herein.

FIG. 9 is a block diagram illustrating components of a machine 900, according to some examples, able to read instructions 916 from a machine-readable medium (e.g., a machine-readable storage medium) and perform any one or more of the methodologies discussed herein. Specifically, FIG. 9 shows a diagrammatic representation of the machine 900 in the example form of a computer system, within which the instructions 916 (e.g., software, a program, an application, an applet, an app, or other executable code) for causing the machine 900 to perform any one or more of the methodologies discussed herein may be executed. For example, the instructions 916 can implement one or more of the modules or circuits or components of FIGS. 4-8, such as can be configured to carry out the audio signal processing discussed herein. The instructions 916 can transform the general, non-programmed machine 900 into a particular machine programmed to carry out the described and illustrated functions in the manner described (e.g., as an audio processor circuit). In alternative embodiments, the machine 900 operates as a standalone device or can be coupled (e.g., networked) to other machines. In a networked deployment, the machine 900 can operate in the capacity of a server machine or a client machine in a server-client network environment, or as a peer machine in a peer-to-peer (or distributed) network environment.

The machine 900 can comprise, but is not limited to, a server computer, a client computer, a personal computer (PC), a tablet computer, a laptop computer, a netbook, a set-top box (STB), a personal digital assistant (PDA), an entertainment media system or system component, a cellular telephone, a smart phone, a mobile device, a wearable device (e.g., a smart watch), a smart home device (e.g., a smart appliance), other smart devices, a web appliance, a network router, a network switch, a network bridge, a headphone driver, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 can include or use processors 910, such as including an audio processor circuit, non-transitory memory/storage 930, and I/O components 950, which can be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) can include, for example, a circuit such as a processor 912 and a processor 914 that may execute the instructions 916. The term "processor" is intended to include a multi-core processor 912, 914 that can comprise two or more independent processors 912, 914 (sometimes referred to as "cores") that may execute the instructions 916 contemporaneously. Although FIG. 9 shows multiple processors 910, the machine 900 may include a single processor 912, 914 with a single core, a single processor 912, 914 with multiple cores (e.g., a multi-core processor 912, 914), multiple processors 912, 914 with a single core, multiple processors 912, 914 with multiples cores, or any combination thereof, wherein any one or more of the processors can include a circuit configured to encode audio and/or video signal information, or other data.

The memory/storage 930 can include a memory 932, such as a main memory circuit, or other memory storage circuit, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the cache memory of processor 912, 914), or any suitable combination thereof, during execution thereof by the machine 900. Accordingly, the memory 932, the storage unit 936, and the memory of the processors 910 are examples of machine-readable media.

As used herein, "machine-readable medium" means a device able to store the instructions 916 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device, camera, or other such input mechanisms, while a headless server machine will likely not include such a touch input device. It will be appreciated that the I/O components 950 may include many other components that are not shown in FIG. 9. The I/O components 950 are grouped by functionality merely for simplifying the following discussion, and the grouping is in no way limiting. In various example embodiments, the I/O components 950 may include output components 952 and input components 954. The output components 952 can include visual components (e.g., a display such as a plasma display panel (PDP), a light emitting diode (LED) display, a liquid crystal display (LCD), a projector, or a cathode ray tube (CRT)), acoustic components (e.g., loudspeakers), haptic components (e.g., a vibratory motor, resistance mechanisms), other signal generators, and so forth. The input components 954 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), video input components, and the like.

In further example embodiments, the I/O components 950 can include biometric components 956, motion components 958, environmental components 960, or position (e.g., location and/or orientation) components 962, among a wide array of other components. For example, the biometric components 956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like, such as can influence inclusion, use, or selection of a listener-specific or environment-specific filter. The motion components 958 can include acceleration sensor components (e.g., accelerometer), gravitation sensor components, rotation sensor components (e.g., gyroscope), and so forth, such as can be used to track changes in a location of a listener or a capture device, such as can be further considered or used by the processor to update or adjust a frame of reference for an audio signal. The environmental components 960 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect reverberation decay times, such as for one or more frequencies or frequency bands), proximity sensor or room volume sensing components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 can include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 can include communication components 964 operable to couple the machine 900 to a network 980 or devices 970 via a coupling 982 and a coupling 972 respectively. For example, the communication components 964 can include a network interface component or other suitable device to interface with the network 980. In further examples, the communication components 964 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 can be another machine or any of a wide variety of peripheral devices (e.g., a peripheral device coupled via a USB).

Moreover, the communication components 964 can detect identifiers or include components operable to detect identifiers. For example, the communication components 964 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF49, Ultra Code, UCC RSS-2D bar code, and other optical codes), or acoustic detection components (e.g., microphones to identify tagged audio signals). In addition, a variety of information can be derived via the communication components 964, such as location via Internet Protocol (IP) geolocation, location via Wi-Fi® signal triangulation, location via detecting an NFC beacon signal that may indicate a particular location or orientation, and so forth. Such identifiers can be used to determine information about one or more of a reference or local impulse response, reference or local environment characteristic, reference or device location or orientation, or a listener-specific characteristic.

In various example embodiments, one or more portions of the network 980, such as can be used to transmit encoded frame data or frame data to be encoded, can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 can include a wireless or cellular network and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 can be transmitted or received over the network 980 using a transmission medium via a network interface device (e.g., a network interface component included in the communication components 964) and using any one of a number of well-known transfer protocols (e.g., hypertext transfer protocol (HTTP)). Similarly, the instructions 916 can be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Various aspects of the invention can be used independently or together. For example, Aspect 1 can include or use subject matter (such as an apparatus, a system, a device, a method, a means for performing acts, or a device readable medium including instructions that, when performed by the device, can cause the device to perform acts), such as can include or use a method for updating a frame of reference for a spatial audio signal. Aspect 1 can include receiving a first spatial audio signal from an audio capture source, the audio capture source having a first frame of reference relative to an environment, receiving information about a second frame of reference relative to the same environment, the second frame of reference corresponding to a second capture source, determining a difference between the first and second frames of reference and, using the first spatial audio signal and the determined difference between the first and second frames of reference, generating a second spatial audio signal referenced to the second frame of reference.

Aspect 2 can include or use, or can optionally be combined with the subject matter of Aspect 1, to optionally include receiving the information about the second frame of reference, including receiving information about a frame of reference for an image capture sensor.

Aspect 3 can include or use, or can optionally be combined with the subject matter of one or any combination of Aspects 1 or 2 to optionally include receiving the information about the second frame of reference, including receiving information about a frame of reference for a second audio capture sensor.

Aspect 4 can include or use, or can optionally be combined with the subject matter of one or any combination of Aspects 1 through 3 to optionally include receiving the information about the second frame of reference, including receiving a geometric description of the second frame of reference including at least a view angle.

Aspect 5 can include or use, or can optionally be combined with the subject matter of one or any combination of Aspects 1 through 4 to optionally include determining the difference between the first and second frames of reference, including determining a translation between the audio capture source and the second capture source.

Aspect 6 can include or use, or can optionally be combined with the subject matter of one or any combination of Aspects 1 through 5 to optionally include determining the difference between the first and second frames of reference, including determining an orientation difference between a reference direction for the audio capture source and a reference direction for the second capture source.

Aspect 7 can include or use, or can optionally be combined with the subject matter of one or any combination of Aspects 1 through 6 to optionally include generating a first filter based on the determined difference between the first and second frames of reference. In Aspect 7, generating the second spatial audio signal can include applying the first filter to at least one component of the first spatial audio signal.

Aspect 8 can include or use, or can optionally be combined with the subject matter of one or any combination of Aspects 1 through 7 to optionally include active spatial processing including spatially analyzing components of the first spatial audio signal and providing a first set of positions, applying spatial transformations to the first set of positions to thereby generate a second set of positions relative to the second frame of reference, and generating the second spatial audio signal referenced to the second frame of reference by resynthesizing components of the first spatial audio signal using the second set of positions.

Aspect 9 can include or use, or can optionally be combined with the subject matter of one or any combination of Aspects 1 through 7 to optionally include dissociating components of the first spatial audio signal, and determining respective filters for the components of the first spatial audio signal, and the filters can be configured to update respective reference locations of the components based on the determined difference between the first and second frames of reference. In the example of Aspect 9, generating the second spatial audio signal can include applying the filters to the respective components of the first spatial audio signal.

Aspect 10 can include or use, or can optionally be combined with the subject matter of one or any combination of Aspects 1 through 9 to optionally include receiving the first spatial audio signal as a first ambisonic signal.

Aspect 11 can include or use, or can optionally be combined with the subject matter of Aspect 10, to optionally include generating the second spatial audio signal, including generating a second ambisonic signal based on the first ambisonic signal and on the determined difference between the first and second frames of reference.

Aspect 12 can include or use, or can optionally be combined with the subject matter of one or any combination of Aspects 1 through 11 to optionally include generating the second spatial audio signal, including generating at least one of an ambisonic signal, a matrix signal, and a multiple-channel signal.

Aspect 13 can include or use, or can optionally be combined with the subject matter of one or any combination of Aspects 1 through 12 to optionally include receiving the first spatial audio signal using a microphone array.

Aspect 14 can include or use, or can optionally be combined with the subject matter of one or any combination of Aspects 1 through 13 to optionally include receiving dimension information about a rig that is configured to hold the audio capture source and the second capture source in a fixed spatial relationship, wherein determining the difference between the first and second frames of reference includes using the dimension information about the rig.

Aspect 15 can include or use subject matter (such as an apparatus, a system, a device, a method, a means for performing acts, or a device readable medium including instructions that, when performed by the device, can cause the device to perform acts), such as can include or use a system for adjusting one or more input audio signals based on a listener position relative to a speaker, such as can include or one or more of the Aspects 1 through 14 alone or in various combinations. In an example, Aspect 14 includes a system for processing audio information to update a frame of reference for a spatial audio signal. The system of Aspect 15 can include a spatial audio signal processor circuit configured to receive a first spatial audio signal from an audio capture source, the audio capture source having a first frame of reference relative to an environment, receive information about a second frame of reference relative to the same environment, the second frame of reference corresponding to a second capture source, determine a difference between the first and second frames of reference, and, using the first spatial audio signal and the determined difference between the first and second frames of reference, generate a second spatial audio signal referenced to the second frame of reference.

Aspect 16 can include or use, or can optionally be combined with the subject matter of Aspect 15, to optionally include the audio capture source and the second capture source, and the second capture source comprises an image capture source.

Aspect 17 can include or use, or can optionally be combined with the subject matter of Aspect 16, to optionally include a rig that is configured to hold the audio capture source and the image capture source in a fixed spatial or geometric relationship.

Aspect 18 can include or use, or can optionally be combined with the subject matter of one or any combination of Aspects 15 through 17 to optionally include a source tracker configured to sense information about an updated position of the first or second capture source, and the spatial audio signal processor circuit can be configured to determine the difference between the first and second frames of reference in response to information from the source tracker indicating the updated position of the first or second capture source.

Aspect 19 can include or use, or can optionally be combined with the subject matter of one or any combination of Aspects 15 through 18 to optionally include the spatial audio signal processor circuit configured to determine the difference between the first and second frames of reference based on a translation distance between the audio capture source and the second capture source.

Aspect 20 can include or use, or can optionally be combined with the subject matter of one or any combination of Aspects 15 through 19 to optionally include the spatial audio signal processor circuit configured to determine the difference between the first and second frames of reference based on an orientation difference between a reference direction for the audio capture source and a reference direction for the second capture source.

Aspect 21 can include or use, or can optionally be combined with the subject matter of one or any combination of Aspects 15 through 20 to optionally include the spatial audio signal processor circuit configured to receive the first spatial audio signal in a first spatial audio signal format and generate the second spatial audio signal in a different second spatial audio signal format.

Aspect 22 can include or use subject matter (such as an apparatus, a system, a device, a method, a means for performing acts, or a device readable medium including instructions that, when performed by the device, can cause the device to perform acts), such as can include or use a system for adjusting one or more input audio signals based on a listener position relative to a speaker, such as can include or one or more of the Aspects 1 through 21 alone or in various combinations. In an example, Aspect 22 includes a method for changing a frame of reference for a first spatial audio signal, the first spatial audio signal including multiple signal components representing audio information from different depths or directions relative to an audio capture location associated with an audio capture source device. In an example, Aspect 22 can include receiving at least one component of the first spatial audio signal from the audio capture source device, the audio capture source device having a first reference origin and a first reference orientation relative to an environment, receiving information about a second frame of reference relative to the same environment, the second frame of reference corresponding to an image capture source, and the image capture source having a second reference origin and a second reference orientation relative to the same environment, and determining a difference between the first and second frames of reference, including at least a translation difference between the first and second reference origins and a rotation difference between the first and second reference orientations. In an example, Aspect 22 can include, using the determined difference between the first and second frames of reference, determining a first filter to use to generate at least one component of a second spatial audio signal that is based on the at least one component of the first spatial audio signal and is referenced to the second frame of reference.

Aspect 23 can include or use, or can optionally be combined with the subject matter of Aspect 22, to optionally include receiving the at least one component of the first spatial audio signal as a component of a first B-format ambisonic signal. In Aspect 23, generating the at least one component of the second spatial audio signal can include generating a component of a different second B-format ambisonic signal.

Aspect 24 can include or use, or can optionally be combined with the subject matter of one or any combination of Aspects 22 or 23 to optionally include receiving the at least one component of the first spatial audio signal, including receiving the first component in a first spatial audio format. In Aspect 24, generating the at least one component of the second spatial audio signal can include generating the at least one component in a different second spatial audio format.

Aspect 25 can include or use, or can optionally be combined with the subject matter of one or any combination of Aspects 22 through 24 to optionally include determining whether the first and/or second reference origin or reference orientation has changed and, in response, selecting a different second filter to use to generate the at least one component of the second spatial audio signal.

Each of these non-limiting Aspects can stand on its own, or can be combined in various permutations or combinations with one or more of the other Aspects or examples provided herein.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated. In this document, the terms “including” and “in which” are used as the plain-English equivalents of the respective terms “comprising” and “wherein.”

Conditional language used herein, such as, among others, “can,” “might,” “may,” “e.g.,” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made. As will be recognized, certain embodiments of the inventions described herein can be embodied within a form that does not provide all of the features and benefits set forth herein, as some features can be used or practiced separately from others.

Moreover, although the subject matter has been described in language specific to structural features or methods or acts, it is to be understood that the subject matter defined in the appended claims is not necessarily limited to the specific features or acts described above. Rather, the specific features and acts described above are disclosed as example forms of implementing the claims.

What is claimed is:

1. A method for updating a frame of reference for a spatial audio signal, the method comprising:

receiving a first spatial audio signal from an audio capture source, the audio capture source having a first frame of reference relative to an environment, and the first spatial audio signal including multiple signal components representing audio information from different depths or directions relative to a location of the audio capture source in the environment;

receiving information about a second frame of reference relative to the same environment, the second frame of reference corresponding to an image capture sensor;

determining a difference between the first and second frames of reference;

decomposing the first spatial audio signal into respective audio signal components, each audio signal component having a corresponding position in the environment;

selecting, based on the determined difference between the first and second frames of reference, respective filters for processing the audio signal components of the first spatial audio signal;

applying the selected filters to the respective audio signal components of the first spatial audio signal to generate respective spatially transformed components; and using the spatially transformed components, generating a second spatial audio signal referenced to the second frame of reference.

2. The method of claim 1, wherein determining the difference between the first and second frames of reference includes determining a translation between the audio capture source and the image capture sensor.

3. The method of claim 1, wherein determining the difference between the first and second frames of reference includes determining an orientation difference between a reference direction for the audio capture source and a reference direction for the image capture sensor.

4. The method of claim 1, wherein selecting the respective filters for processing the audio signal components of the first spatial audio signal includes selecting filters configured to update respective reference locations of the components based on the determined difference between the first and second frames of reference.

5. The method of claim 1, wherein receiving the first spatial audio signal includes receiving a first ambisonic signal, and wherein generating the second spatial audio signal includes generating a second ambisonic signal based on the first ambisonic signal and on the determined difference between the first and second frames of reference.

6. The method of claim 1, wherein generating the second spatial audio signal includes generating at least one of an ambisonic signal, a matrix signal, and a multiple-channel signal.

7. The method of claim 1, wherein receiving the first spatial audio signal from an audio capture source includes receiving the first spatial audio signal using a microphone array.

8. The method of claim 1, further comprising receiving dimension information about a rig that is configured to hold the audio capture source and the image capture sensor in a fixed spatial relationship, wherein determining the difference between the first and second frames of reference includes using the dimension information about the rig.

9. A system for processing audio information to update a frame of reference for a spatial audio signal, the system comprising:

a spatial audio signal processor circuit configured to:

receive a first spatial audio signal from an audio capture source, the audio capture source having a first frame of reference relative to an environment, and the first spatial audio signal including multiple signal components representing audio information from different depths or directions relative to a location of the audio capture source in the environment;

receive information about a second frame of reference relative to the same environment, the second frame of reference corresponding to a second capture source;

determine a difference between the first and second frames of reference;

decompose the first spatial audio signal into respective audio signal components, each audio signal component having a corresponding position in the environment;

select, based on the determined difference between the first and second frames of reference, respective filters for processing the audio signal components of the first spatial audio signal;

apply the selected filters to the respective audio signal components of the first spatial audio signal to generate respective spatially transformed components; and using the spatially transformed components, generate a second spatial audio signal referenced to the second frame of reference.

10. The system of claim 9, further comprising the audio capture source and the second capture source, and the second capture source comprises an image capture source.

11. The system of claim 10, further comprising a rig that is configured to hold the audio capture source and the image capture source in a fixed geometric relationship.

12. The system of claim 9, further comprising a source tracker configured to sense information about an updated position of the first or second capture source, and wherein the spatial audio signal processor circuit is configured to determine the difference between the first and second frames of reference in response to information from the source tracker indicating the updated position of the first or second capture source.

13. The system of claim 9, wherein the spatial audio signal processor circuit is configured to determine the difference between the first and second frames of reference based on a translation distance between the audio capture source and the second capture source.

14. The system of claim 9, wherein the spatial audio signal processor circuit is configured to determine the difference between the first and second frames of reference based on an orientation difference between a reference direction for the audio capture source and a reference direction for the second capture source.

15. The system of claim 9, wherein the spatial audio signal processor circuit is configured to receive the first spatial audio signal in a first spatial audio signal format and generate the second spatial audio signal in a different second spatial audio signal format.

16. A method for changing a frame of reference for a first spatial audio signal, the first spatial audio signal including multiple signal components representing audio information from different depths or directions relative to an audio capture location associated with an audio capture source device, the method comprising:

receiving components of the first spatial audio signal from the audio capture source device, the audio capture source device having a first reference origin and a first reference orientation relative to an environment;

receiving information about a second frame of reference relative to the same environment, the second frame of reference corresponding to an image capture source, and the image capture source having a second reference origin and a second reference orientation relative to the same environment;

determining a difference between the first and second frames of reference, including at least a translation difference between the first and second reference origins and a rotation difference between the first and second reference orientations; and using the determined difference between the first and second frames of reference, determining respective filters to use to generate components of a second spatial audio signal, and generating the second spatial audio signal with the components of the second spatial audio signal, wherein the generated components of the second spatial audio signal are-based on corresponding components of the first spatial audio signal and the second spatial audio signal is referenced to the second frame of reference.

17. The method of claim 16, wherein receiving the components of the first spatial audio signal includes receiving components of a first B-format ambisonic signal, and wherein generating the second spatial audio signal includes generating a different second B-format ambisonic signal.

18. The method of claim 16, wherein receiving the components of the first spatial audio signal includes receiving the components in a first spatial audio format, and wherein generating the second spatial audio signal includes generating a signal in a different second spatial audio format.

19. The method of claim 16, further comprising:

determining whether the first and/or second reference origin or reference orientation has changed and, in response, selecting different filters to use to generate the components of the second spatial audio signal.

* * * * *